(12) United States Patent
Tsuji et al.

(10) Patent No.: US 7,429,083 B2
(45) Date of Patent: Sep. 30, 2008

(54) OTTOMAN DEVICE

(75) Inventors: Eiichiro Tsuji, Anjo (JP); Yukifumi Yamada, Toyota (JP); Takahiro Ishijima, Aichi-ken (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 33 days.

(21) Appl. No.: 11/334,539

(22) Filed: Jan. 19, 2006

(65) Prior Publication Data

US 2006/0158015 A1    Jul. 20, 2006

(30) Foreign Application Priority Data

Jan. 19, 2005 (JP) ............... 2005-012067
Jan. 19, 2005 (JP) ............... 2005-012068

(51) Int. Cl.
*A47C 7/50* (2006.01)
*A47C 20/00* (2006.01)

(52) U.S. Cl. .............. 297/423.26; 297/423.28

(58) Field of Classification Search ............ 297/423.26, 297/423.28, 423.3
See application file for complete search history.

(56) References Cited

U.S. PATENT DOCUMENTS

| | | | | |
|---|---|---|---|---|
| 2,918,964 A | | 12/1959 | Braun | |
| 4,306,746 A | * | 12/1981 | Crum | 297/85 |
| 4,337,977 A | * | 7/1982 | Rogers et al. | 297/85 |
| 4,668,009 A | * | 5/1987 | Talley et al. | 297/85 |
| 4,707,025 A | * | 11/1987 | Rogers, Jr. | 297/259.2 |
| 5,056,862 A | | 10/1991 | May et al. | |
| 5,368,366 A | * | 11/1994 | Mizelle | 297/423.3 |
| 5,374,101 A | * | 12/1994 | Wiecek | 297/85 |
| 5,505,519 A | * | 4/1996 | Natt | 297/250.1 |

FOREIGN PATENT DOCUMENTS

| | | |
|---|---|---|
| JP | 6-31967 | 8/1994 |
| JP | 2000-201772 A | 7/2000 |
| JP | 2002-119376 | 4/2002 |

OTHER PUBLICATIONS

European Search Report dated Apr. 25, 2006.

* cited by examiner

*Primary Examiner*—Sarah B McPartlin
(74) *Attorney, Agent, or Firm*—Buchanan Ingersoll & Rooney PC

(57) ABSTRACT

An ottoman device includes a first rotation link rotatably supported at a front end of a seat in order to support an ottoman main body, which is extended to a front direction of the seat or stored within the seat, in accordance with the rotation of the rotation link in a first direction and a second direction, and a lock device for prohibiting or allowing the rotation of the first rotation link, the lock device being attached to the first rotation link at a rotational center thereof.

9 Claims, 9 Drawing Sheets

OTTOMAN DEVICE

CROSS REFERENCE TO RELATED APPLICATIONS

This application is based on and claims priority under 35 U.S.C. § 119 to Japanese Patent Application 2005-012067, filed on Jan. 19, 2005 and Japanese Patent Application 2005-012068, filed on Jan. 19, 2005, the entire content of which is incorporated herein by reference.

FIELD OF THE INVENTION

This invention generally relates to an ottoman device whose ottoman main body is extended in a front direction of the seat and is stored within the seat.

BACKGROUND

According to a known ottoman device disclosed in 2000-201772A a posture of an ottoman main body can be adjusted between a stored state and an extended state by moving a nut in a front-rear direction of a seat by rotating a screw that is positioned under the seat, and by oscillating a main link, which is connected to the nut, and rotation link, which comprises a link device.

Because the ottoman device has the screw in order to adjust and support the position of the ottoman main body, a large space needs to be provided under the seat in order to store the ottoman main body. However, if the space is limited and a distance from the vehicle floor to a seating surface of the seat needs be reduced, it becomes difficult to store such ottoman device under the seat.

Further, the ottoman device has a structure in which two rotation links and the main link support an excessive external force, which is applied to the ottoman main body in a front direction or a downward direction thereof. In such case, the nut is engaged with the screw so as not to move in a front-rear direction of the seat, however, because the main link is connected to the nut so as to be rotatable, when the external force is applied to the ottoman main body in a front direction, the ottoman main body is supported and the posture of the ottoman main body is maintained only by use of a rigidity of the link. This happens because all links are rotatably connected and not locked each other at a specific portion. Thus, in order to secure a supporting strength of the ottoman main body, each link needs to be thickened substantially.

Further, in order to extend the ottoman main body at an upward position, longer rotation links need to be provided and a pitch between the rotation links needs to be shortened. Thus, it becomes more difficult to maintain the posture of the ottoman main body.

A need thus exist to provide an ottoman device that secures the supporting strength of the ottoman main body appropriately.

Another ottoman device disclosed in JP06-031967Y extends an ottoman main body stored under the seat in a front direction thereof by means of a four-link mechanism. Specifically, the ottoman device includes a mechanical lock device (a shaft lock device) having a compressed spring by which the top end portion of the ottoman main body is connected to a bottom portion of a seat cushion. When the mechanical lock device is unlocked by means of a release lever (an operation portion), the ottoman main body is oscillated and extended in a font direction of the seat. On the other hand, when the ottoman device is in an extended state and unlocked by means of the release lever, the ottoman main body is oscillated and stored under the seat.

In this configuration, because the ottoman main body is rotated when its position is changed from the stored state to the extended state, the compressed spring is elongated in accordance with the extension of a rod of the lock device, and the biasing force (spring force) becomes smaller.

On the other hand, as shown in FIG. 2 and FIG. 5 of JP06-031967Y, comparing an angle between a rotational center A1 (a rotational center B1) and a working direction of the compressed spring when the ottoman main body is in an extended state, and the angle when the ottoman main body is in a stored state, these angles are approximately the same, or the angle in the extended state is less than the angle in the stored state.

Further, in order to lift up the ottoman main body by use of the biasing force of the compressed spring (in order to extend the ottoman main body), a torque in the vicinity of the rotational center (A1 or B1) on the basis of the biasing force when the ottoman main body is in an extended state is set to be equal to or more than the ottoman main body's weight moment.

Thus, when the ottoman main body is stored manually, the biasing force becomes larger in accordance with the compression of the compressing spring, a large operation force is required to store the ottoman main body.

SUMMARY OF THE INVENTION

According to an aspect of the present invention, an ottoman device includes a first rotation link rotatably supported at a front end of a seat in order to support an ottoman main body, which is extended to a front direction of the seat or stored within the seat, in accordance with the rotation of the rotation link in a first direction and a second direction, and a lock device for prohibiting or allowing the rotation of the first rotation link, the lock device being attached to the first rotation link at a rotational center thereof.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 6:
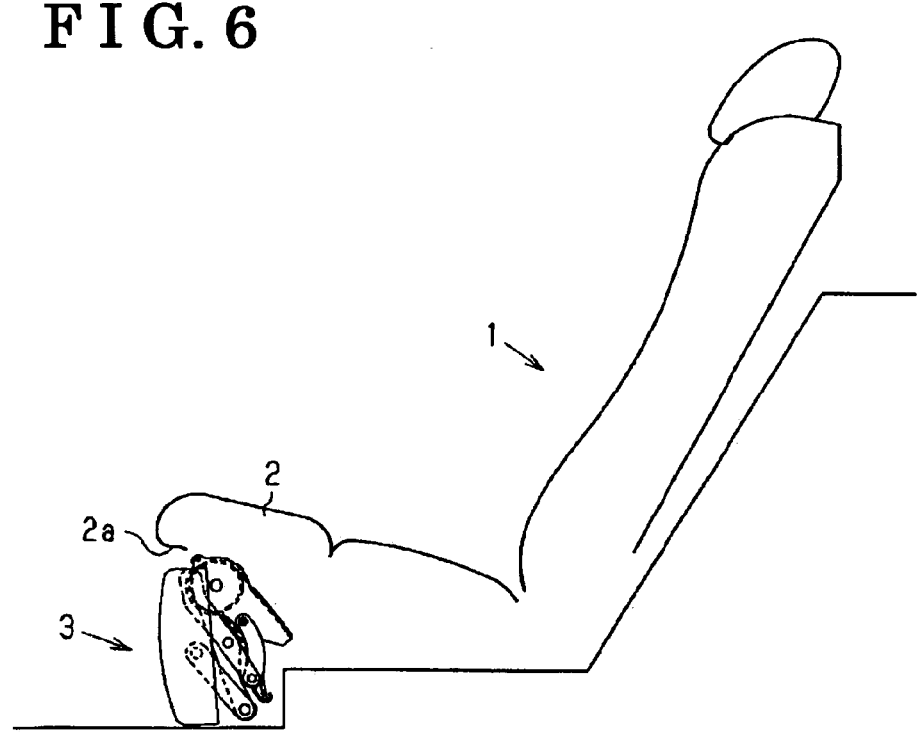
FIG. 6 illustrates a schematic view indicating a vehicle seat device.

The first embodiment of the present invention will be explained in accordance with the attached drawings. FIG. 6 illustrates a side view schematically indicating a vehicle seat device 1 to which the present invention is applied. Specifically, the vehicle seat device 1 serves as a seat to be mounted on a vehicle such as an automobile.

As shown in FIG. 6, the vehicle seat device 1 includes a seat cushion 2 and an ottoman device 3. Specifically, a storage space 2a is formed at the seat cushion 2 so as to extend from the front-bottom portion toward a rear direction, and the ottoman device 3 is supported by the seat cushion 2 corresponding to the storage space 2a in a manner that will be explained later.

When the ottoman device 3 is positioned at a stored state as shown in FIG. 6, the ottoman device 3 is positioned so as to fit the storage space 2a. On the other hand, when the ottoman device 3 is positioned in an extended state, the ottoman device 3 is extended in a front direction of the seat cushion 2.

Figure 1:
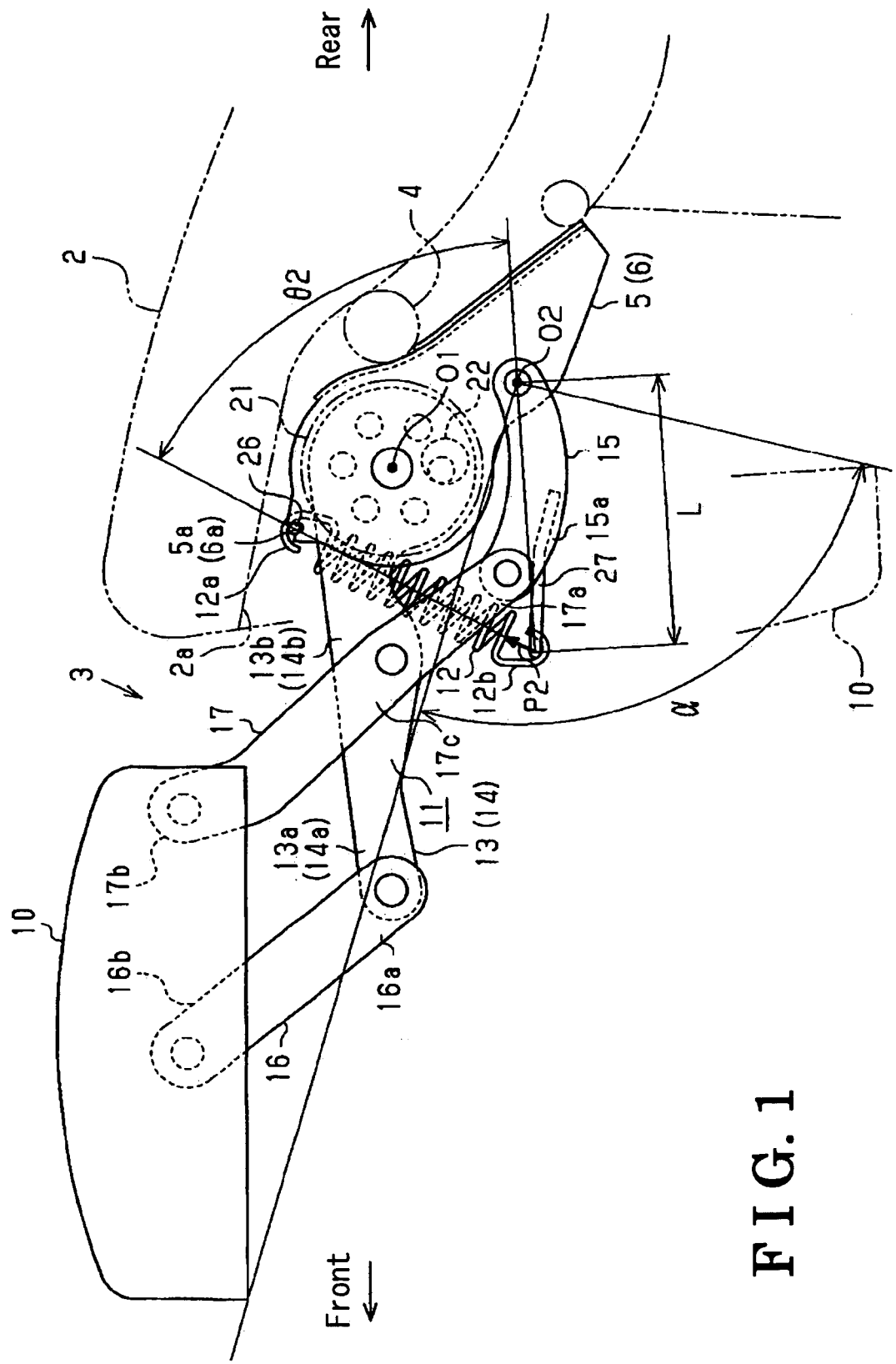
FIG. 1 illustrates a side view indicating an ottoman device in the first embodiment according to the present invention.
Figure 2:
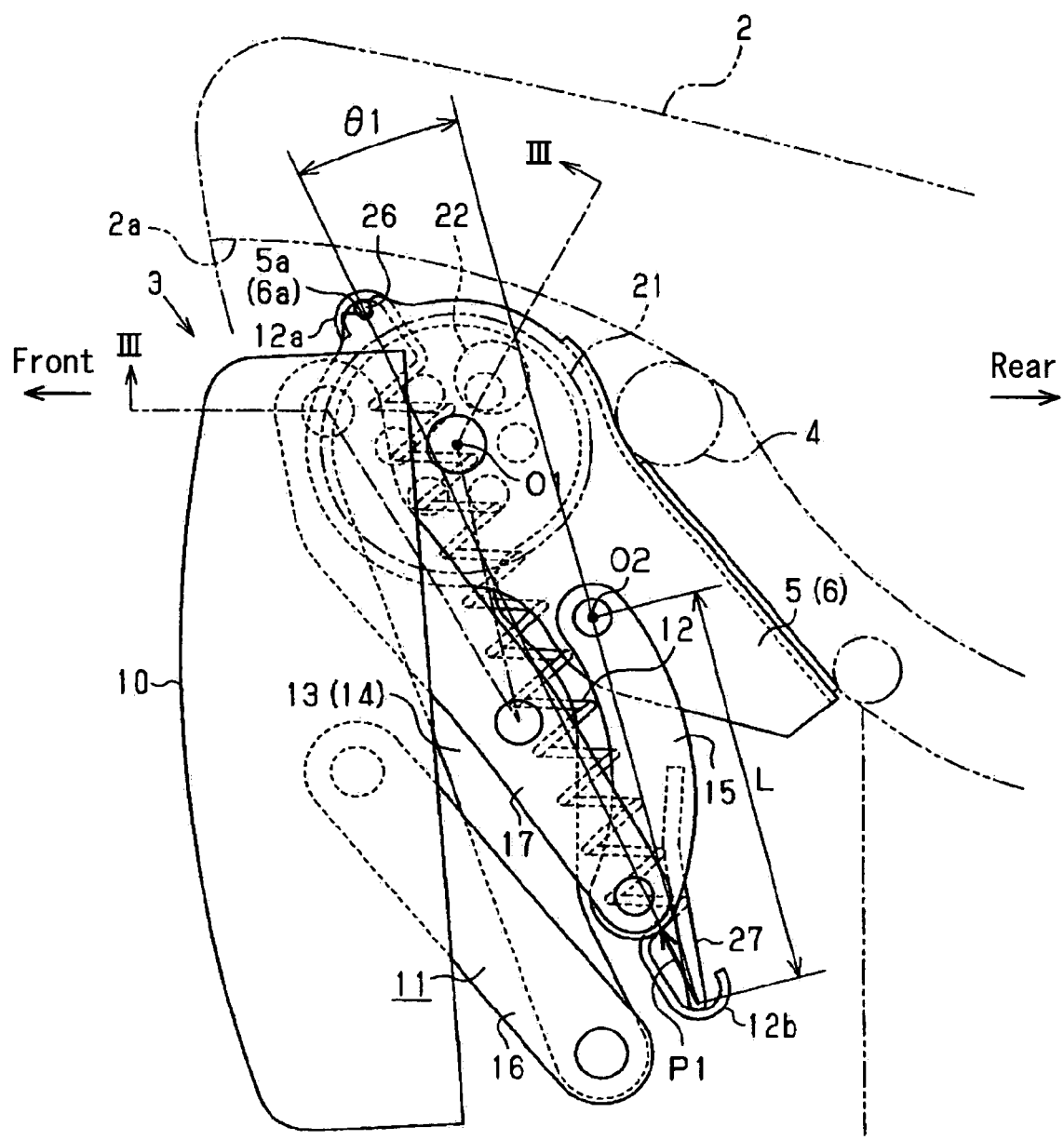
FIG. 2 illustrates another side view indicating the ottoman device in the first embodiment according to the present invention.
Figure 3:
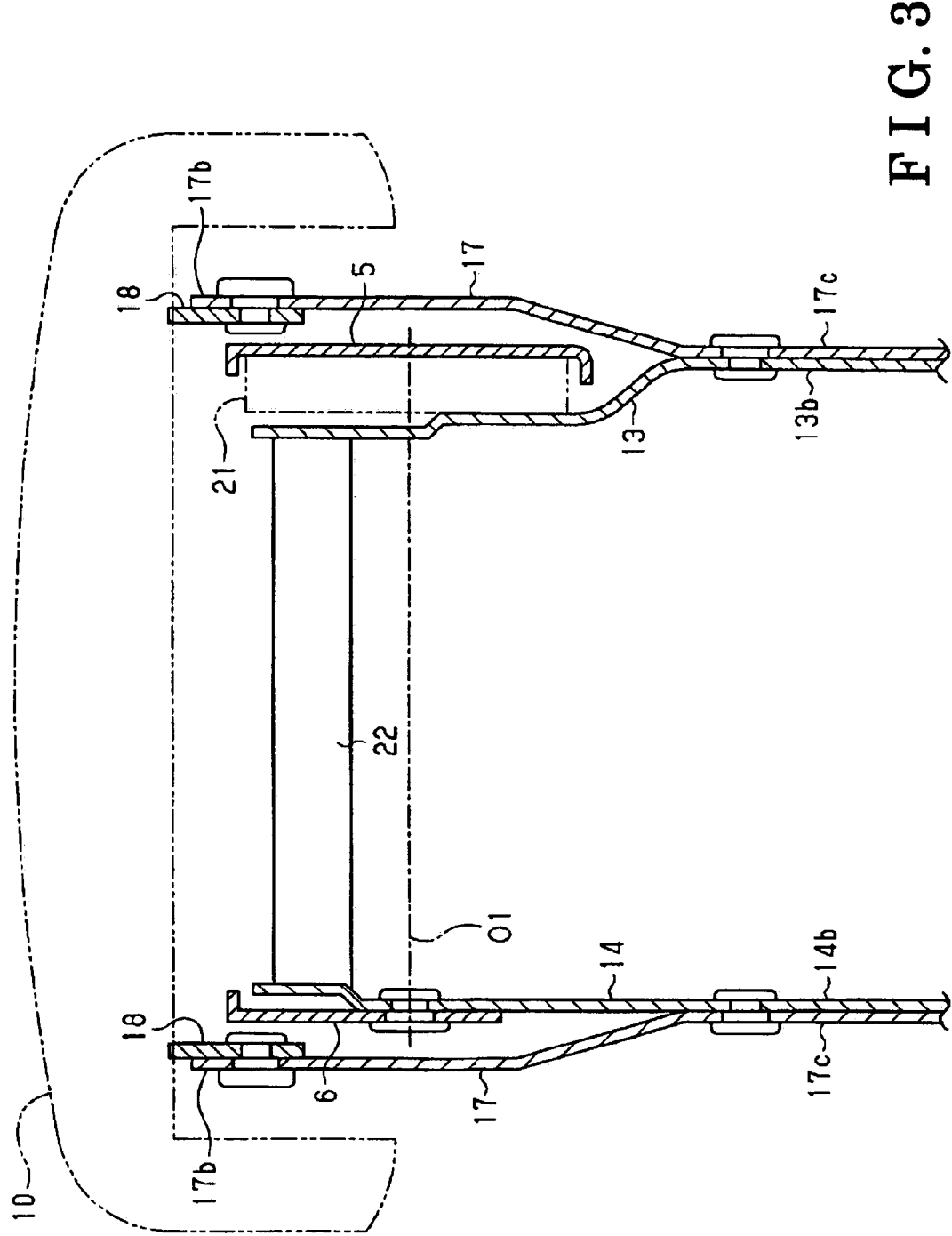
FIG. 3 illustrates a cross section indicating the ottoman device shown in FIG. 2 along III-III line.
Figure 4:
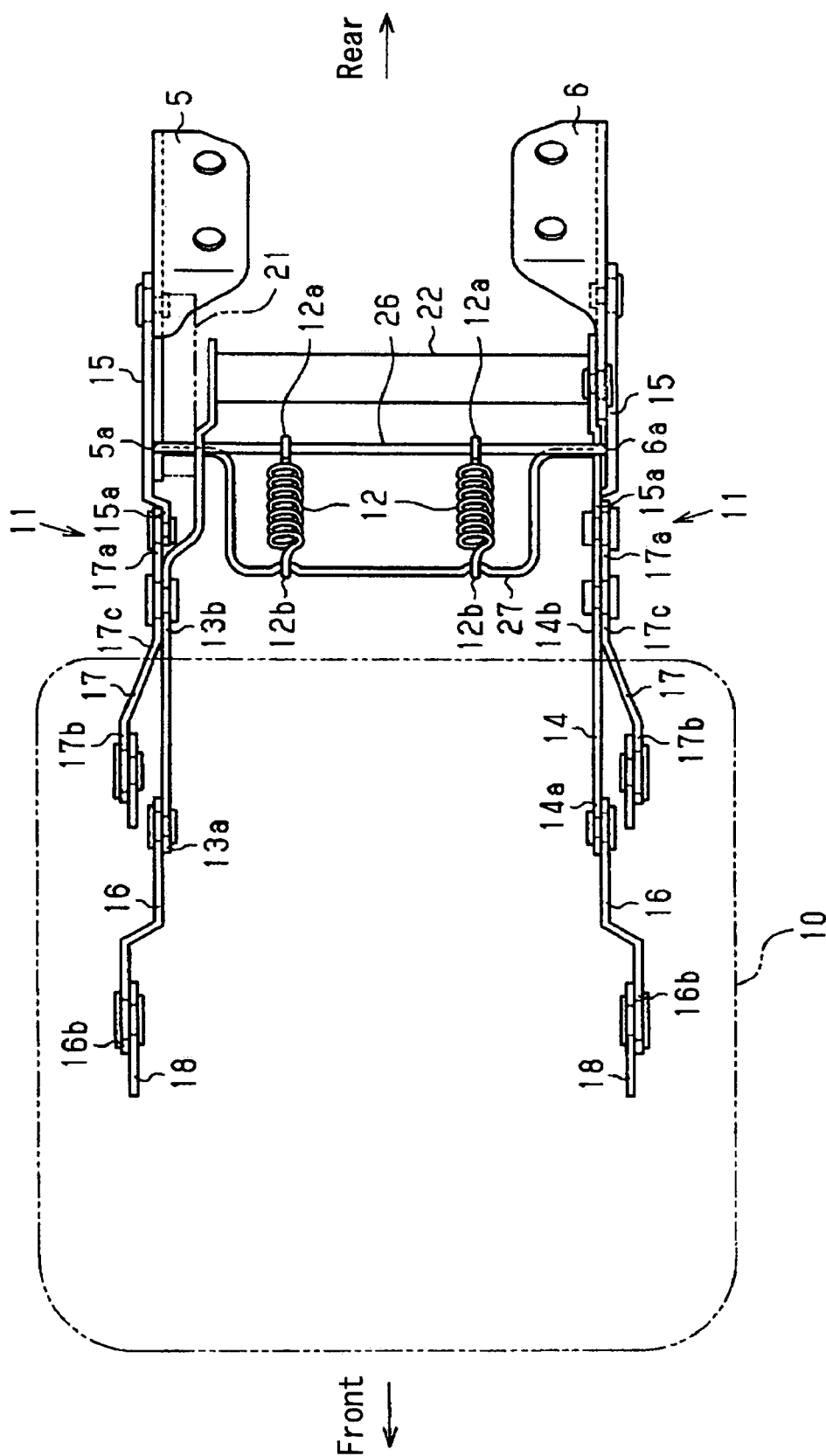
FIG. 4 illustrates a flat view indicating the ottoman device of the first embodiment.

FIG. 1 illustrates a side view of the ottoman device 3 positioned in an extended state. FIG. 2 illustrates a side view of the ottoman device 3 positioned in a stored state. Each of the side views is seen from left in the direction of the front of the vehicle seat device 1. As shown in FIG. 1 and FIG. 2, the vehicle seat device 1 includes a seat frame 4 at a front end of the seat cushion 2 in order to support the seat cushion 2. FIG. 3 illustrates a cross section of the ottoman device along III-III line illustrated in FIG. 2. FIG. 4 illustrates a flat view of the ottoman device, which is positioned in an extended state. As shown in FIG. 3 and FIG. 4, a mounting bracket 5 and a mounting bracket 6 are fixed to the seat fame 4 so as to be paired in a seat width direction (right-left direction in FIG. 3). As shown in FIG. 4, the ottoman device 3 includes an ottoman main body 10, a pair of link devices 11 and a pair of tension coil springs 12. Specifically, the ottoman main body 10 serves as a footrest when it is positioned in an extended state. The link devices 11, which is provided at the left hand, is connected to the mounting bracket 5, and the other of the link devices 11, which is provided at the right hand, is connected to the mounting bracket 6 in order to support the ottoman main body 10. Each of the tension coil springs 12 serves as a biasing means.

More specifically, the link device 11, which is provided at left hand in the direction of the front of the vehicle seat device 1 (provided at upper in FIG. 4), includes a main rotation link 13, a sub rotation link 15, which is provided at the left hand, a first oscillating link 16, which is provided at the left hand, and a second oscillating link 17 which is provided at the left hand. Specifically, the main rotation link 13 serves as a first rotation link, which is supported by the mounting bracket 5 by means of the lock device 21, and the sub rotation link 15 serves as a second rotation link, which is rotatably supported by the mounting bracket 5. The lock device 21 is used for allowing and prohibiting (locks and unlocks) the rotation of the main rotation link 13 relative to the mounting bracket 5.

The link device 11 positioned on the right hand in the direction of the front of the vehicle seat device 1 (provided at bottom in FIG. 4) has a configuration and kinetic characteristics, which is identical to that of the link device provided on the left. Specifically, the link device 11 provided on the right in the direction of the front of the vehicle seat device includes a main rotation link 14 instead of the main rotation link 13.

The main rotation link 14 serves as a first rotation link rotatably supported by the mounting bracket 6.

The main rotations link 13 and 14 includes a same region center O1, which extend in a seat width direction, and are provided on one side of each of the mounting brackets 5 and 6 (upper-left in FIG. 1).

The main rotation links 13 and 14 are formed in an identical shape except that the main rotation link 13 is formed so as to be molded to the lock device 21.

Because each of the link devices 11 is formed in an identical shape except the main rotation links 13 and 14, only a configuration of the ink device 11 provided on the left hand will be explained below. Numerals of components of the link device 11 provided on the right hand are parenthesized.

Figure 5:
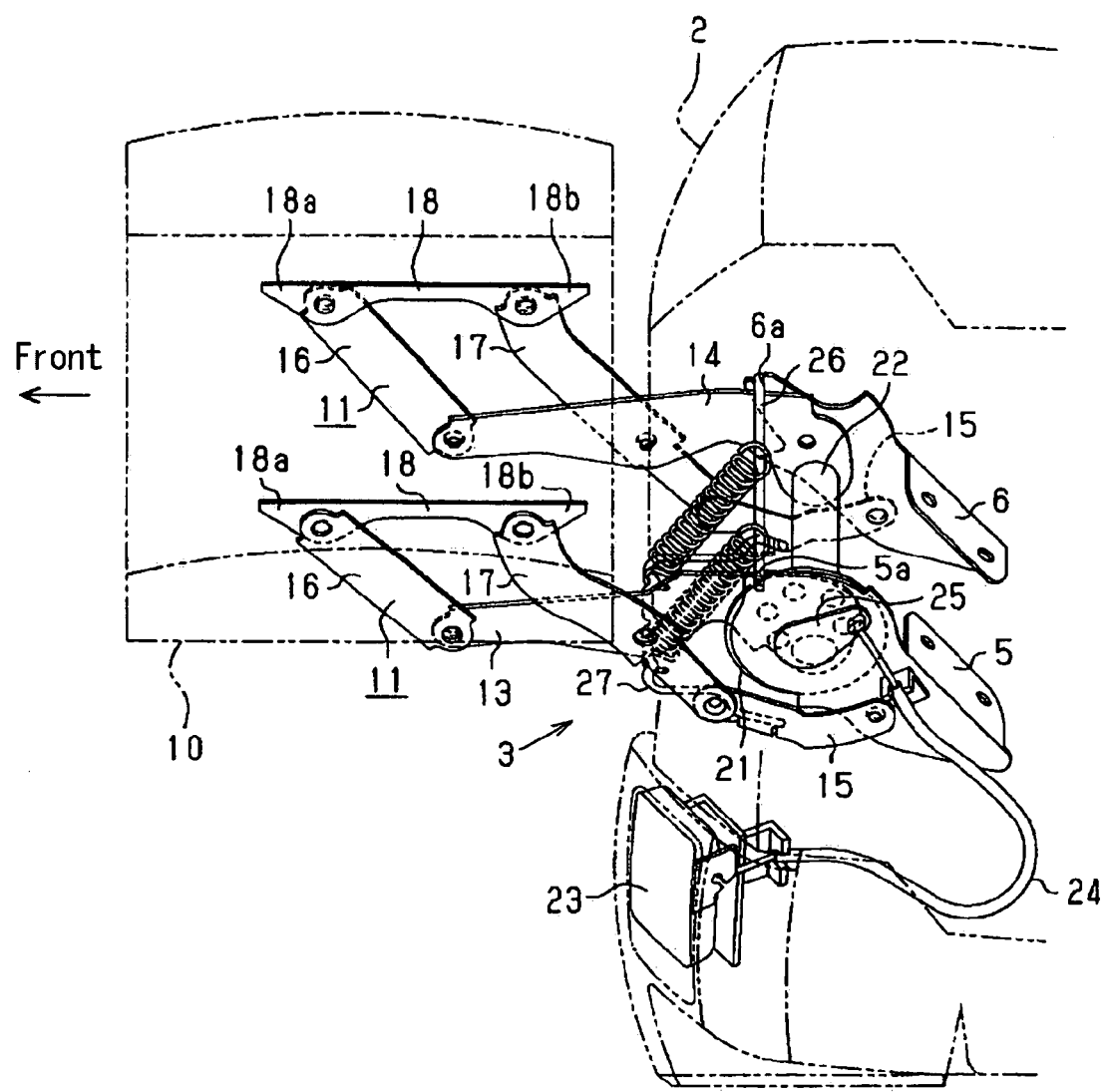
FIG. 5 illustrates an oblique perspective view indicating the ottoman device of the first embodiment.

The sub rotation link 15 has a rotation center O2 extending in a seat width direction and is supported by the mounting bracket 5 (6) at a lower-right end thereof in FIG. 1. The first oscillating link 16 includes a first end portion 16a and a second end portion 16b, the main rotation link 13 (14) includes a first end portion 13a (14a) and a central portion 13b (14b), and the supporting bracket 18 includes a first end portion 18a and a second end portion 18b (as shown in FIG. 5). The first end portion 16a of the first oscillating link 16 is rotatably supported by the first end portion 13a (14a) of the main rotation link 13 (14), and the second end portion 16b of the first oscillating link 16 is rotatably supported by the first end portion 18a of the supporting bracket 18 (the first end portion 18a is shown in FIG. 5), which is fixed to the ottoman main body 10.

The second oscillating link 17 includes a first end portion 17a (right-bottom in FIG. 1), a second end portion 17b (left-upper FIG. 1) and a central portion 17c.

The first end portion 17a of the second oscillating link 17 is rotatably supported by the first end portion 15a of the sub rotation link 15, the second end portion 17b of the second oscillating link 17 is supported by the second end portion 18b of the supporting bracket 18 (the second end portion 18b is shown in FIG. 5), and the central portion 17c of the second oscillating link 17 is rotatably connected to the central portion 13b (14b) of the main rotation link 13 (14).

Specifically, the link device 11, by which the ottoman main body 10 is connected to the front end of the seat (mount brackets 5 and 6), includes a so called X-arm type mechanism in order to regulate the actuation of the ottoman main body 10 between the stored state and the extended state.

For example, when the ottoman main body 10 is in the extended state as shown in FIG. 1, and the sub rotation link 15 is rotated in one direction (in an anticlockwise direction in FIG. 1), the main rotation link 13(14) is also rotated in the same direction (in an anticlockwise direction in FIG. 1) by means of the second oscillating link 17. Then, the second end portion 16b of the first oscillating link 16 and the second end portion 17b of the second oscillating link 17 are moved in a rear direction of the seat in a manner where the first oscillating link 16 and the second oscillating ha 17 are folded. Accordingly, the ottoman main body 10, which is supported by the first and the second oscillating links 16 and 17, is stored within the storage space 2a as shown in FIG. 2.

On the other hand, when the ottoman main body 10 is in the stored state as shown in FIG. 2, and the sub rotation link 15 is rotated in the other direction (in a clockwise direction in FIG. 2), the main rotation link 13(14) is also rotated in the same direction (in a clockwise direction in FIG. 2) by means of the second oscillating link 17. Then, the second end portion 16b of the first oscillating link 16 and the second end portion 17b of the second oscillating link 17 are moved in a front direction of the seat in a manner where the first oscillating link 16 and the second oscillating link 17 are extended. Accordingly, the ottoman main body 10, which is supported by the first and the second oscillating links 16 and 17, is extended to a front direction of the seat.

The lock device 21 includes a known locking/unlocking mechanism, which is used in order to adjust and maintain the rotational angle of the main rotation link 13 relative to the mounting bracket 5.

In this embodiment, a multipurpose locking/unlocking mechanism (so called a reclining mechanism), which is used for adjusting and maintaining the angle of a seat back of the seat relative to the seat cushion, is used as the lock device 21. The configuration of the lock device 21 will be schematically explained. The lock device 21 includes an outer cylinder portion, an inner cylinder portion and a lock member. Specifically, the outer cylinder portion is formed in a cylindrical shape having a bottom portion and joined to the mounting bracket 5 so as to be coaxial to the rotation center O1, the inner cylinder portion is also formed in a cylindrical shape having a bottom portion and supported by the outer cylinder portion and joined to the main rotation link 13. The lock member allows and prohibits the relative rotation of the outer cylinder portion and the inner cylinder portion FIG. 5 illustrates an oblique perspective view of the ottoman device 3. As shown in FIG. 5, the mounting bracket 5 supports a releasing link 25, which is engaged with the lock member of the lock device 21. More specifically, the lock device 21 allows and prohibits the relative rotation between the outer cylinder portion and the inner cylinder portion, in other words the relative rotation between the mounting bracket 5 and the main rotation link 13, by the actuation of the lock member in accordance with the rotation of the releasing link 25 in one direction or the other direction. The lock member is basically biased by means of a biasing member (not shown) in the direction of prohibit the relative rotation.

As shown in FIG. 5, an operation lever 23 is provided to the left side of the front end of the seat (left side in the direction of the front of the vehicle seat device 1). Specifically, the operation lever 23 is connected to the releasing link 25 by means of the transmission cable 24, and in this configuration, when the operation lever 23 is operated, the operation force of the operation lever 23 transmitted by means of the transmission cable 24, and then the releasing link 25 is rotated in one direction. On the other hand, when the operation lever 23 is released, the releasing link 25 is rotated in the other direction so as to be restored to its original position. Specifically, when the operation lever 23 is operated, the main rotation link 13 is allowed to rotate relative to the mounting bracket 5 by means of the lock device 21 in order to adjust the position the ottoman main body 10 at an appropriate place. On the other hand, when the operation lever 23 is released, the main rotation link 13 is prohibited to rotate relative to the mounting bracket 5 by means of the lock device 21 in order to maintain the ottoman main body 10 at the appropriate place.

The main rotation link 13 and the main rotation link 14, connected to the inner cylinder member of the lock device 21, are also connected to a torque rod 22 so as to be integral therewith, the torque rod 22 being formed in a cylinder column shape and extending in a manner where its axis line extends in a seat width direction. The axis line of the torque rod 22 is located so as not to be identical with the rotation center O1, in other words, the axis line of the torque rod 22 is located so as to be out from the rotation center O1 in an axial direction.

The rotation of the main rotation link 13 is transmitted through the torque rod 22 to the main rotation link 14 in order to, for example, rotate the main rotation link 14 in conjunction with the rotation of the main rotation link 13. Further, when the main rotation link 13 is controlled so as not to rotate by means of the lock device 21, the rotation of the main rotation link 14 can also be prohibited by means of the lock device 21, which is connected to the main rotation link 13. Specifically, in this embodiment, a single lock device is provided at the main rotation link 13, it can allow and prohibit the both rotations of the main rotation link 13 and the main rotation link 14. Further, the rotation of the main rotation link 13 is transmitted to the main rotation link 14 by means of the torque rod 22, which is made of a simple rigid body.

The pair of coil springs 12 is provided between the mount brackets 5 and the mounting bracket 6, and the left sub rotation link 15 and the right sub rotation link 15, in a manner where the coil springs 12 apply biasing force (spring force) to the ottoman main body 10 in order to extend the ottoman main body 10 in a front direction of the seat. Specifically, as shown in FIG. 4 and FIG. 5, a groove 5a is formed at one end of the mounting bracket 5, and a groove 6a is formed at one end of the mourning bracket 6. A seat engaging bar 26 is provided between the mounting bracket 5 and the mounting bracket 6 in a manner where one end of the seat engaging bar 26 is engaged with the groove 5a and the other end of the seat engaging bar 26 is engaged with the groove 6a. A link engaging bar 27 is provided between the left and the right sub rotation links 15 in a manner where one end of the link engaging bar 27 is joined to one sub rotation link 15, which is provided at the left hand, and the other end of the link engaging bar 27 is joined to the other sub rotation link 15, which is provided at the right hand. As shown in FIG. 4, the link engaging bar 27 is formed in an approximate C-shape so as to protrude in the front direction of the seat, and each of the coil springs 12 is provided between the link engaging bar 27 and the seat engaging bar 26 in a manner where one end (spring hook 12a) of the coil spring 12 is engaged with the seat engaging bar 26 and the other end (spring hook 12b) of the coil spring 12 is engaged with the link engaging bar 27. The coil springs 12 are provided so as to be approximately symmetrical in a seat width direction. Because each of the coil springs 12 is provided in order to apply biasing force so as to pull in its axial direction thereof, and as shown in FIG. 1 and FIG. 2, each of the coil springs 12 is extended in the stored state so as to be in its maximum length, and the length is gradually shortened in accordance with the rotation of the sub rotation link 15 in a clockwise direction in FIG. 2. These coil springs 12 help the ottoman main body 10 to extend by means of it biasing force.

As shown in FIG. 1 and FIG. 2, assuming that the biasing force of the coil spring 12 is "P", a distance between a working point of the biasing force P (engaging point between the spring hook 12b and the link engaging bar 27) to the rotation center O2 is "L", an angle of a line, which connects the rotation center O2 and the front end of the ottoman main body 10, relative to the stored state of the ottoman main body 10 is "α", and an angle between the line, which connects the rotation center O2 and the working point of the biasing force P, and the working line of the biasing force P (a line connecting spring hook 12a and the spring hook 12b) is "θ".

Because, when the ottoman main body 10 is stored under the seat, the coil spring 12 is extended so as to be elongated gradually in accordance with the rotation of the sub rotation link 15 in an anticlockwise direction in FIG. 1, the biasing force P is proportionally increased in accordance with the rotation of the sub rotation link 15 in an anticlockwise direction, in other words, in accordance with the decrease of the extended angle α. Specifically, as shown in FIG. 1, the biasing force P becomes a minimum value P2 when the ottoman main body 10 is in an extended state at which the extended angle α becomes a maximum value (α). On the other hand, as shown in FIG. 2, the biasing force P becomes a maximum value P1 when the ottoman main body 10 is in a stored stare at which the extended angel α becomes zero.

In this embodiment, the working point, the working line or the like of the biasing force P are set in a manner where the angle θ becomes a max value θ2 when the ottoman device is in the extended state at which the extended angle α becomes a max value (α), the angle α becomes a minimum value θ2 when the ottoman device is in the stored state at which the extended angle θ becomes zero, and the angle θ proportionally decreases from the extended state to the stored state. In this circumstance, the torque T of the sub rotation link 15 on the basis of the biasing force P can be obtained by the following formula.

$$T=P*L*\sin\theta$$

Thus, the torque T1 in the stored state and the torque T2 in the maximum extended state can be obtained by the following formulas.

$$T1=P1*L*\sin\theta1$$

$$T2=P2*L*\sin\theta2$$

$$(0<\sin\theta1<\sin\theta2\leq1)$$

Figure 7:
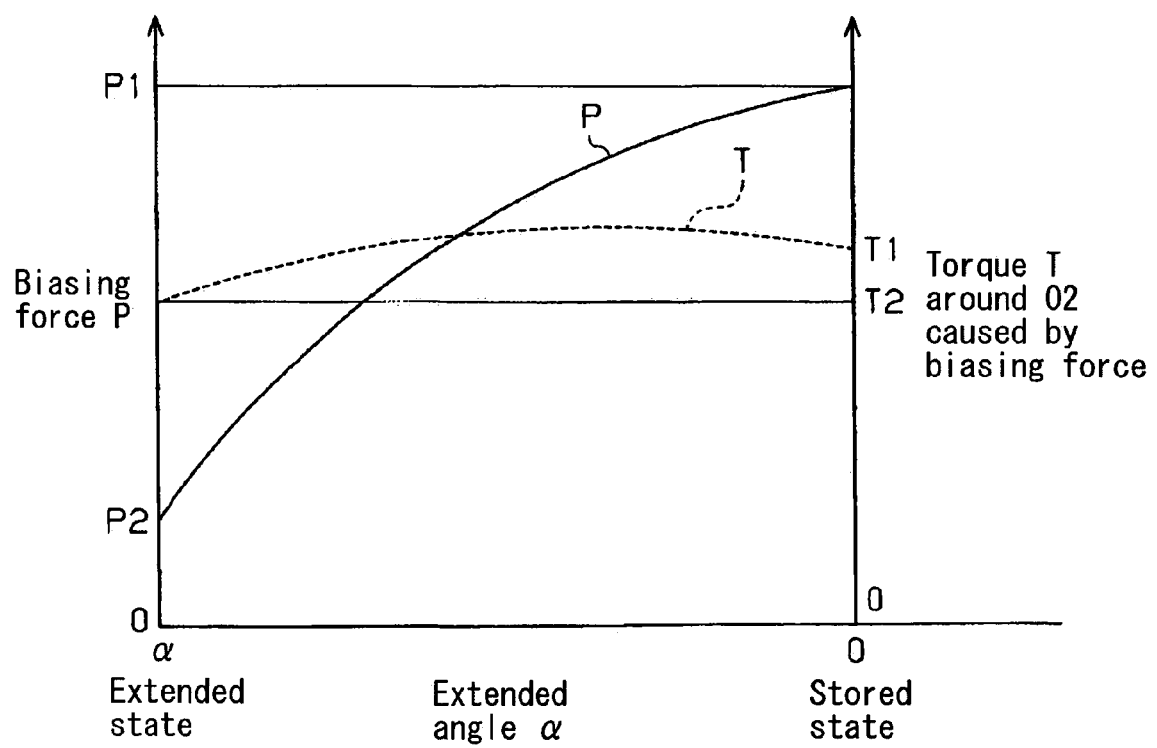
FIG. 7 illustrates a graph indicating a relationship among an extended angle, a biasing force and a torque.

In accordance with the decrease of the extended angle α, the biasing force P is proportionally increased and the angle θ (sin θ) is proportionally decreased, and on the basis of these values, as shown in FIG. 7, the variation of the torque T as a whole can be restrained in order to equalize an operation force (torque T), which is required to store the ottoman main body 10.

The operation of the ottoman device 3 will be explained. When the ottoman main body 10 is positioned in a stored state as shown in FIG. 2, and the releasing link 25 is rotated in one direction by operating the operation lever 23 through the transmission cable 24, the lock device 21 allows the main rotation link 13 to rotate relative to the mounting bracket 5. And then, the coil spring 12 helps the sub rotation link 15 to rotate in one direction (clockwise direction in FIG. 2). In accordance with the rotation of the sub rotation link 15, the main rotation link 13, the main rotation link 14, the first oscillating link 16 and the second oscillating link 17, which configure the link device 11, are rotated, as a result, the ottoman main body 10 is automatically extended in the direction of the front of the seat. As mentioned above, in accordance with the rotation of the main rotation link 13 caused by the actuation of the link device 11 (rotation of the sub rotation link 15), the main rotation link 14 is also rotated by means of the torque rod 22.

When the operation ever 23 is released, the releasing link 25 is rowed in the other direction (restored in its original position) by means of the transmission cable 24, and then the lock device 21 prohibits the rotation of the main rotation link 13 relative to the mounting bracket. Then, the ottoman main body 10 is maintained so as to be in an extended state. As mentioned above, in accordance with the rotation of the main rotation link 14, the main rotation link 13 is also rotated by means of the torque rod 22.

On the other hand, when the ottoman main body 10 is in an extended state as shown in FIG. 1 and the releasing link 25 is rotated in one direction through the transmission cable 24 by operating the operation lever 23, lock device 21 allows the main rotation link 13 to rotate relative to the mounting bracket 5 is allowed. At this point, when the ottoman main body 10 is pressed in a lower-rear direction, the sub rotation link 15 is rotated in the other direction (in an anticlockwise direction in FIG. 1) against the biasing force of the coil spring 12. In accordance with this operation, the ottoman main body 10 is stored into the bottom of the front end portion of the seat. In this configuration, the operation force (torque T) required to restore the ottoman main body 10 under the seat is equalize as a whole as mentioned above. In addition, the ottoman main body 10 is maintained at a stored state by releasing the operation lever 23 as mentioned above.

According to the first embodiment, following effects can be obtained.

In the first embodiment, the biasing force P of the coil spring 12 is proportionally increased in accordance with the rotation of the sub rotation link 15 in the other direction when the ottoman main body 10 is stored under the seat. On the other hand, regardless of that the biasing force P is proportionally increased in accordance with the rotation of the sub rotation link 15 in the other direction, because the angle θ (sin θ) between the line, which connects the rotation center O2 of the sub rotation link 15 and the working point of the biasing force P, and the working line of the biasing force P is proportionally decreased, the increment of the torque T, which is used to rotate the sub rotation link 15 in one direction, is restrained. Thus, the operation force (torque T) as a whole, which is required to store the ottoman main body 10 under the seat, can be equalized.

In the first embodiment, because the sub rotation link 15 is biased by means of the coil spring 12 in order to extend in the front direction of the seat, the ottoman main body 10 can be extended automatically.

Second Embodiment

A second embodiment of the present invention will be explained in accordance with the attached drawings. In the second embodiment, a torsion spring (torsion coil spring) is used instead of the pair of the tension coil springs 12 of the first embodiment. The rest of the parts are the same as the first embodiment and their explanations will be skipped here.

Figure 8:
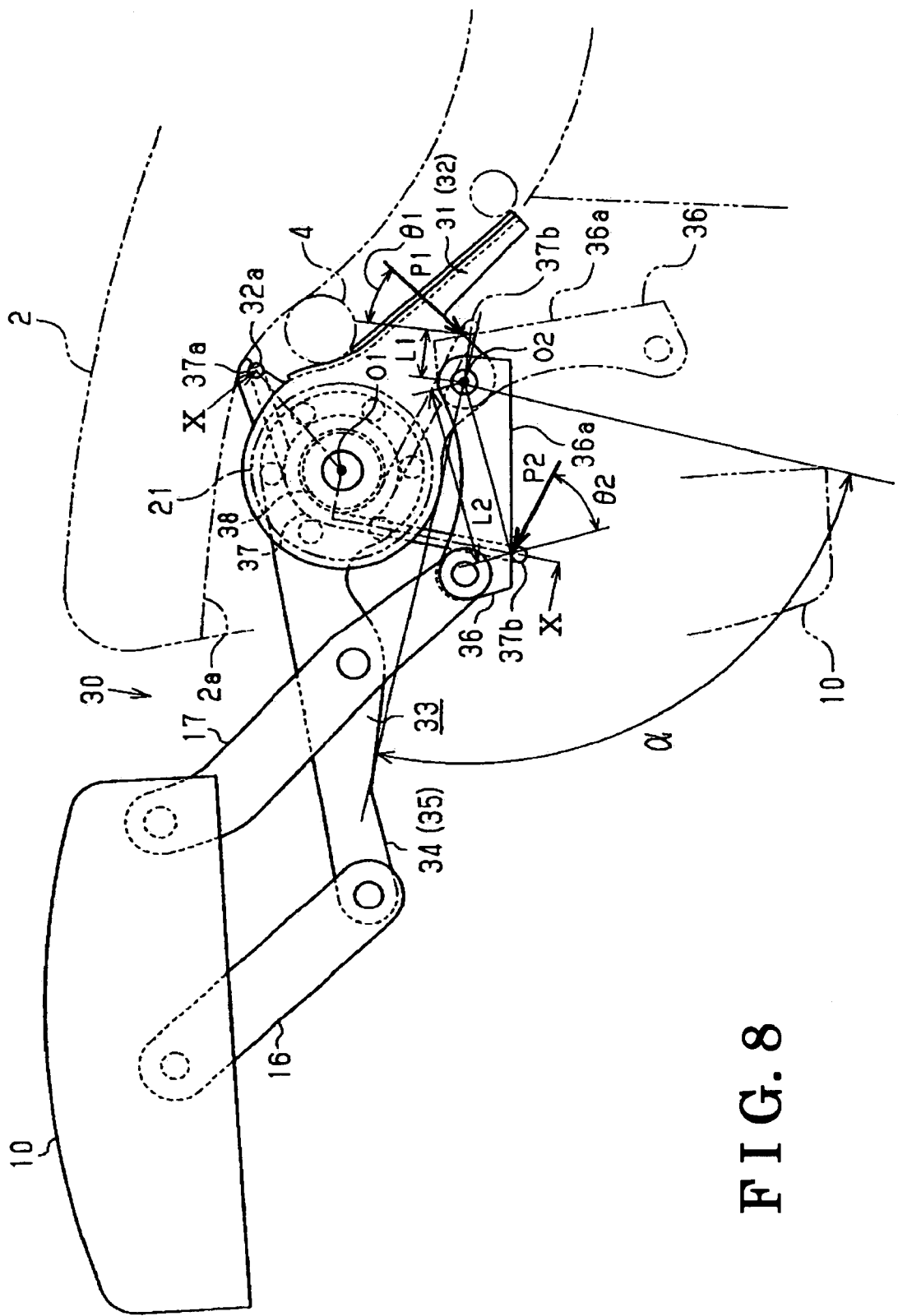
FIG. 8 illustrates a side view indicating an ottoman device in the second embodiment according to the present invention.
Figure 9:
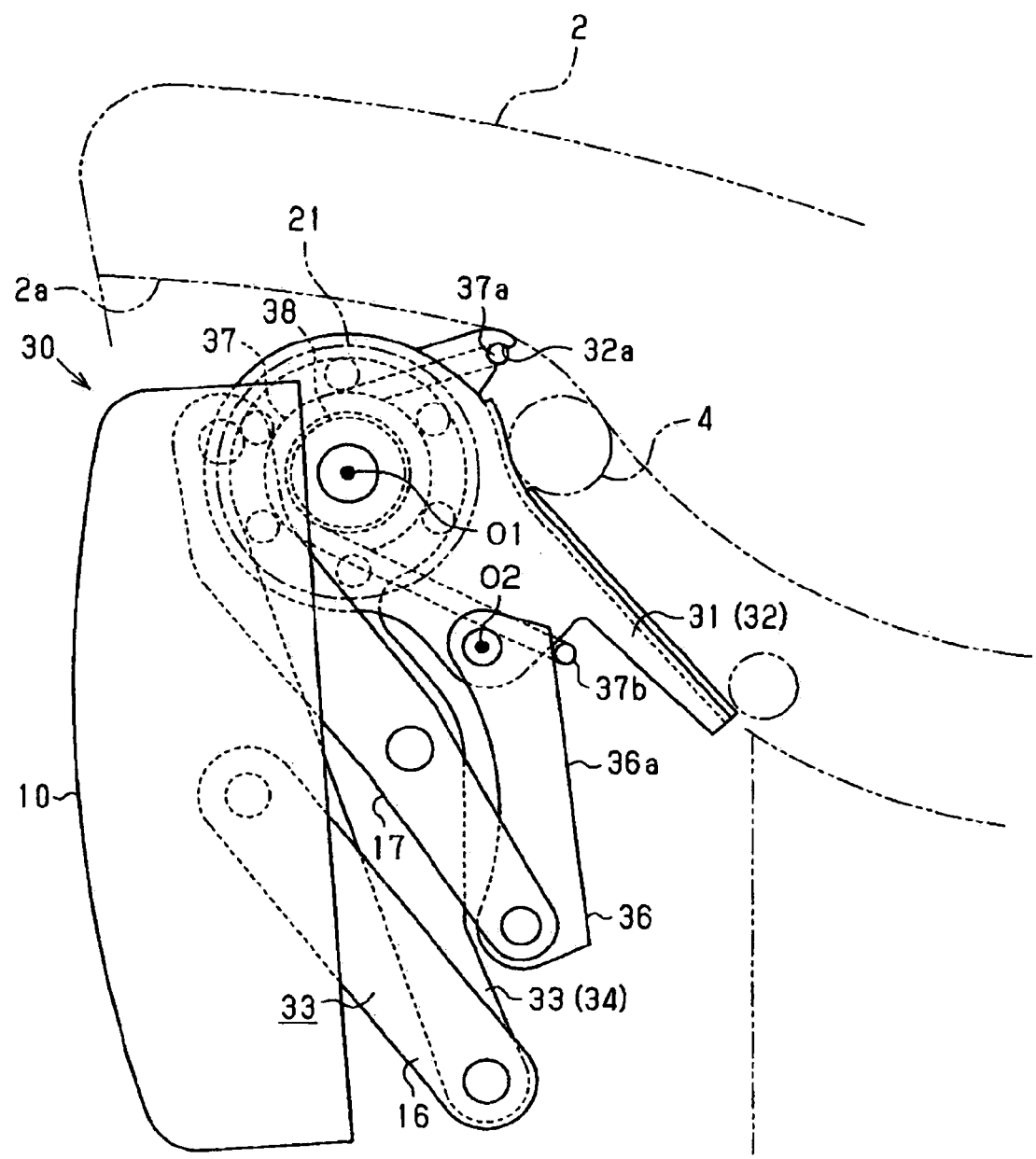
FIG. 9 illustrates another side view indicating the ottoman device in the first second embodiment according to the present invention.
Figure 10:
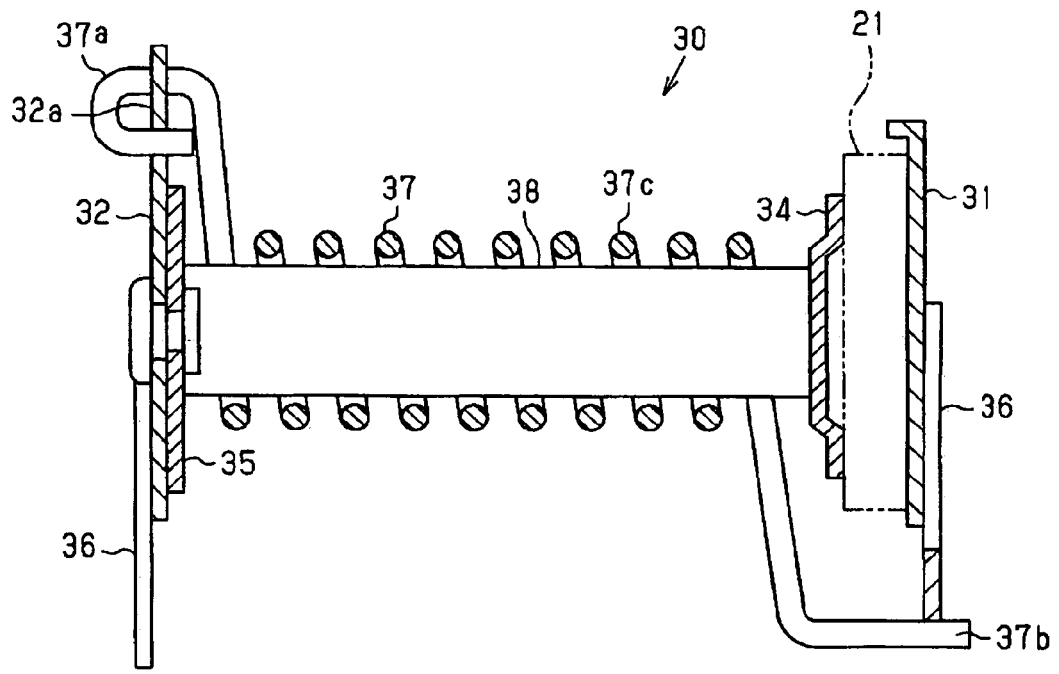
FIG. 10 illustrates a cross section indicating the ottoman device shown in FIG. 8 along X-X line.

FIG. 8 illustrate a side view of the ottoman device 30 positioned in an extended state. FIG. 9 illustrates a side view of the ottoman device 30 positioned in a stored state. Each of the side view is seen from left in the direction of the front of the vehicle. As shown in FIG. 1 and FIG. 2, the vehicle seat device 1 includes a seat frame 4 at a front end of the seat cushion 2 in order to support the seat cushion 2. FIG. 10 illustrates a cross section of the ottoman device 30 along X-X line illustrated in FIG. 8. As shown in FIG. 10, a mounting bracket 31 and a mounting bracket 32 are fixed to the seat fame 4 so as to be paired in a seat width direction (right-left direction in FIG. 10). Further, the ottoman device 30 includes an ottoman main body 10, a pair of the link devices 33, serving as the link devices 11 in the first embodiment, and a torsion spring 27 serving as a biasing means.

More specifically, the link device 33, which is provided at left hand in the direction of the front of the vehicle seat device 1 (provided at front in the direction of orthogonal to the FIG. 8), includes a main rotation link 34 supported to the mounting bracket 31 by means of the lock device 21, a sub rotation link 36, which is supported by the mounting bracket 31 so as to be rotatable, a first oscillating link 16, which is provided at the left hand, and a second oscillating link 17 which is provided at the left hand. The link device 33 positioned on the right hand in the direction of the front of the vehicle seat device 1 (provided at back in the direction of orthogonal to the FIG. 8)

has a configuration and kinetic characteristics, which is identical to that of the link device provided on the left. Specifically, the link device 33 provided on the right hand in the direction of the front of the vehicle seat device includes a main rotation link 35 instead of the main rotation link 34. The main rotation link 35 is supported by the mounting bracket 32 so as to be rotatable.

The main rotation link 34 is supported by the mounting bracket 31 at one end portion thereof (an upper-left portion thereof in FIG. 8), and the main rotation link 35 is supported by the mounting bracket 32 at one end portion thereof (an upper-left portion thereof in FIG. 8), and each of the main rotation links 34 and 35 includes a rotation center O1. Specifically, the main rotation link 34 is formed in the same shape as the main rotation link 35 except the lock device 21 is joined to the main rotation link 34.

The sub rotation link 36 having a rotation center O2 is supported by the mounting bracket 31 (32) at one end portion thereof (right-bottom portion of he mounting bracket 31 (32) in FIG. 8). The guide surface 36a formed at the bottom surface of the sub rotation link 36 is flat and extending in the longitudinal direction of the sub rotation link 36, so that one end of the torsion spring 37 moves along the guide surface 36a.

Configurations between the main rotation links 34 and 35, the sub rotation link 36 and the first and the second oscillating links 16 and 17 are the same as that of the first embodiment.

The main rotation link 34 and the main rotation link 35, connected to the inner cylinder member of the lock device 21, are also connected to a torque rod 38 so as to be integral therewith, the torque rod 38 being formed in a cylinder column shape and emending in a manner where its axis line, which is identical to the rotation center O1, ends in a seat width direction. As shown in FIG. 10, the torsion spring 37 is provided between the mounting bracket 32, which is provided at the left hand, and the sub rotation link 36, which is provided at the right hand. The torsion spring 37 applies biasing force to the ottoman main body 10 in order to extend the ottoman main body 10 in a front direction of the seat. The torque rod 38 is provided so as to penetrate through a coil portion 37c of the torsion spring 37 as shown in FIG. 10.

Specifically, a groove 32a is formed at one end of the mounting bracket 32, and a spring hook 37a, which is provided at one end of the torsion spring 37, is engaged with the groove 32a. On the other hand, a spring hook 37b, which is provided at the other end of the torsion spring 37, is engaged with the sub rotation link 36 in a manner where the spring hook 37b is pressure fitted on a guide surface 36a of the sub rotation link 36. More specifically, as shown in FIG. 10, the torsion spring 37 is provided so as to extend in a seat we direction and positioned so as to be coaxial with the torque rod 38, and one end of the torsion spring 37 (spring hook 37a) and the other end of the torsion spring 37 (spring hook 37b) are distanced in a seat width direction and engaged as mentioned above. The torsion spring 37 applies biasing force in its circumferential direction in order to rotated the sub rotation link 36 in one direction (clockwise direction in FIG. 8). As shown in FIG. 8 and FIG. 9, when the ottoman main body 10 is in a stored state, the torsion spring 37 is tightened at the maximum, and when the ottoman main body 10 is in a stored state, the torsion sprig 37 is loosed at the maximum. In accordance with the sub rotation link 36 rotted in one direction when the ottoman main body 10 is extended in the front direction of the seat, the torsion spring 37 is gradually loosed in order to help the ottoman main body 10 to be by biasing force thereof.

As shown in FIG. 8 and FIG. 9, assuming that the biasing force of the torsion spring 37 is "P", a distance between a wove point of the biasing force P (engaging point between the spring hook 37b and sub rotation link 36) to the rotation center O2 is "L", an angle of a line, which connects the rotation center O2 and the front end of the ottoman main body 10, relative to the stored state of the ottoman main body 10 is "α", and an angle between an orthogonal line relative to the line, which connects the rotation center O2 and the working point of the biasing force P, and the working line of the biasing force P (in a circumferential direction of the rotation center O1, in other words, a line orthogonal to the line connecting the engaging position of the spring hook 37b and the rotation center O1) is "θ".

Because, when the ottoman main body 10 is stored under the seat, the torsion spring 37 is wound up gradually in accordance with. the rotation of the sub rotation link 36 in an anticlockwise direction in FIG. 8, the biasing force P is proportionally increased in accordance with the rotation of the sub rotation link 36 in an anticlockwise direction, in other words, in accordance with the decrease of the extended angle α. Specifically, as shown in FIG. 8, the biasing force P becomes a minimum value P2 when the ottoman main body 10 is in an extended state at which the extended angle a becomes a maximum value (α). On the other band, as shown in FIG. 9, the biasing force P becomes a maximum value P1 when the ottoman main body to is in a stored state at which the extended angle α becomes zero. At this point, as shown in FIG. 8 and FIG. 9, the angle 8 slightly varies within a range between the angle θ2 and the angle θ1.

In this embodiment, the working point, the working line or the like of the biasing force P are set in a manner where the length L becomes a max value L2 when the ottoman device is in the extended state at which the extended angle α becomes a max value (α), and the angle θ becomes a minimum value L1 when the ottoman device is in the stored state at which the extended angle α becomes zero, and the angle θ proportionally decreases from the extended state to the stored state.

In this circumstance, the torque T of the sub rotation link 36 on the basis of the biasing force P can be obtained by the following formula.

$$T = P * L * \cos\theta$$

Thus, the torque T1 in the stored state and the torque T2 in the maximum extended state can be obtained by the following formulas.

$$T1 = P1 * L1 * \cos\theta 1$$

$$T2 = P2 * L2 * \cos\theta 2$$

$$(L1 > L2)$$

Figure 11:
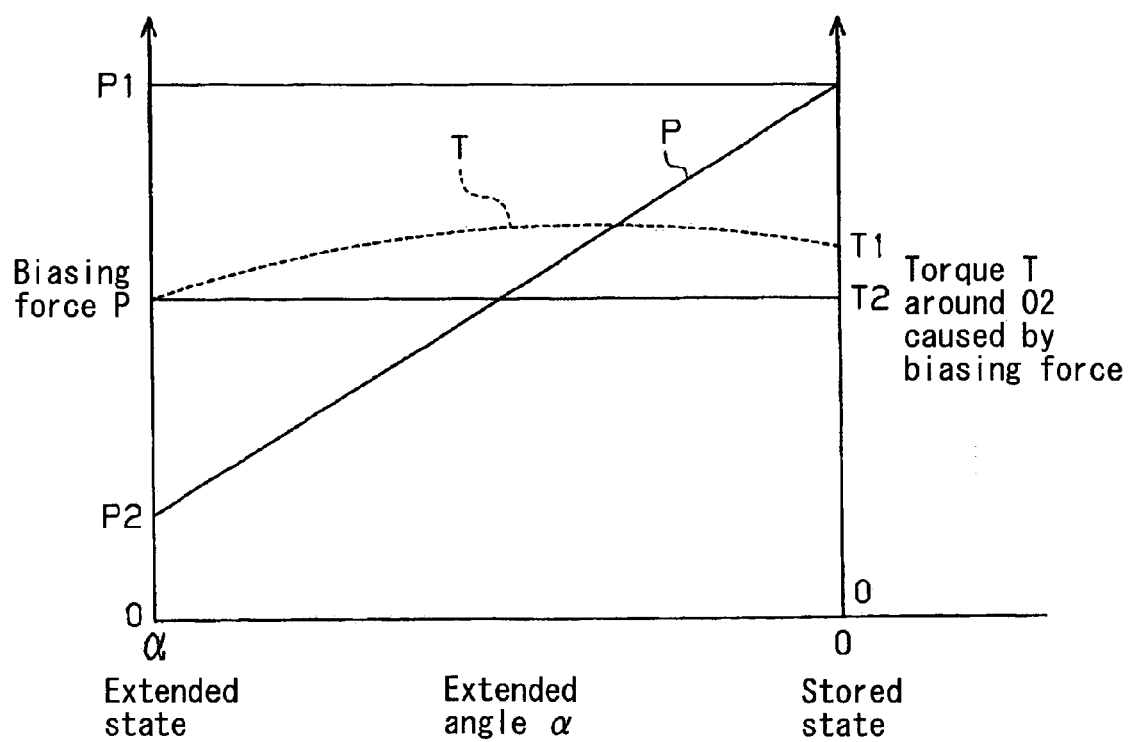
FIG. 11 illustrates a graph indicating a relationship among an extended angle, a biasing force and a torque.

In accordance with the decrease of the extended angle α, the biasing force P is proportionally increased and the distance L controlling the torque T is proportionally decreased, and on the basis of these values, as shown in FIG. 11, the variation of the torque T as a whole can be restrained in order to equalize an operation force (torque T), which is required to store the ottoman main body 10.

The operation of the ottoman device 30 will be explained. When the ottoman main body 10 is positioned in a stored state as shown in FIG. 9, and the releasing link 25 is rotated in one direction through the transmission cable 24 by operating the operation lever 23, the lock device 21 allows the main rotation link 34 to rotate relative to the mounting bracket 31. And then, the torsion spring 37 helps the sub rotation link 36 to rotate in one direction (clockwise direction in FIG. 9). In accordance with the rotation of the sub rotation link 36, the torsion spring 37 is loosed, and the spring hook 37b of the torsion spring 37 is moved toward the front end of the sub rotation link 36 along thereof. Further, the main rotation link 34, the main rotation link 35, the first oscillating link 16 and the second oscillating link 17, which configure the link device 33, are rotated, as a result, the ottoman main body 10 is automatically extended in the direction of the front of the seat. As mentioned above, in accordance with the rotation of the main rotation link 34 caused by the actuation of the link device 33 (rotation of the sub rotation link 36), the main rotation link 35 is also rotated by means of the torque rod 38.

When the operation lever 23 is released, the releasing link 25 is rotated in the other direction (restored in it original position) by means of the transmission cable 24, and then the lock device 21 prohibits the rotation of the main rotation link 31 relative to the mounting bracket 31. Then, the ottoman main body 10 is maintained so as to be in an extended state. As mentioned above, in accordance with the rotation of the main rotation link 34, the main rotation link 35 is also rotated by means of the torque rod 38.

On the other hand, when the ottoman main body 10 is in an extended state as shown in FIG. 8 and the releasing link 25 is rotated in one direction through the transmission cable 24 by operating the operation lever 23, lock device 21 allows the main rotation link 34 to rotate relative to the mounting bracket 31 is allowed. At this point, when the ottoman main body 10 is pressed in a lower-rear direction, the sub rotation link 36 is rotated in the other direction (in an anticlockwise direction in FIG. 8) against the biasing force of the torsion spring 37. In accordance with the rotation of the sub rotation link 36, the torsion spring 37 is tightened, and the spring hook 37b of the torsion spring 37 is moved toward the rear end of the sub rotation link 36 (toward the rotation center O2) along thereof. In accordance with this operation, the ottoman main body 10 is stored into the bottom of the front end portion of the seat. In this configuration, the operation force (torque T) required to restore the ottoman main body 10 under the seat is equalize as a whole as mentioned above. In addition, the ottoman main body 10 is maintained at a stored state by releasing the operation lever 23 as mentioned above.

In the second embodiment, because the sub rotation link 15 is biased by means of the torsion spring 37 in order to extend in the front direction of the seat, the ottoman main body 10 can be extended automatically.

In the second embodiment, the biasing force P of the torsion spring 37 is proportionally increased in accordance with the rotation of the sub rotation link 36 in the other direction when the ottoman main body 10 is stored under the seat.

On the other hand, regardless of that the biasing force P is proportionally increased in accordance with the rotation of the sub rotation link 36 in the other direction, because the distance L between the rotation center O2 of the sub rotation link 36 and the working point of the biasing force P, is proportionally decreased, the increment of the torque T, which is used to rotate the sub rotation link 36 in one direction, is restrained. Thus, the operation force (torque T) as a whole, which is required to store the ottoman main body 10 under the seat, can be equalized.

Thus, the second embodiment can obtain approximately the same effect as the first embodiment. The first and the second embodiment can be altered as follows.

In the first embodiment, the tension coil spring 12 is used, however, a compressed coil spring can be uses alternatively as far as it can applies biasing force to the ottoman main body 10 so as to extend in the front of the seat.

In the first embodiment, two coil springs 12 are provided, however, a single coil sprint 12 or tree or more coil springs may be provided alternatively. In the second embodiment, the spring hook 37a of the torsion spring 37 may be engaged with the sub rotation link 36 (guide surface 36a), and the spring hook 37b may be engaged with the mounting bracket 31 as far as the it can applies biasing force to the ottoman main body 10 so as to extend in the front of the seat.

In the first embodiment, the coil spring 12 applies biasing force to the sub rotation link 15, however, the coil spring 12 may apply biasing force to the main rotation links 13 and 14. In the second embodiment, the torsion spring 37 applies biasing force to the sub rotation link 36; however, the torsion spring 37 may apply biasing force to the main rotation links 34 and 35.

In the first embodiment and the second embodiment, the biasing force P at the stored state may be set to the negative value. Specifically, in accordance with the transition of the ottoman main body 10 toward the stored state, the coil springs (12, 37) may be turn over in order to set a force for maintaining the stored state. In this circumstance, although the ottoman main body 10 needs to extend manually, chances that the ottoman main body 10 is operated in a wrong direction by a wrong operation of the operation lever 23 can be reduced.

In the first embodiment and the second embodiment by use of biasing force of the coil spring 12 or the torsion spring 37, the ottoman main body 10 may be extended by a minor operation force.

In the first embodiment and the second embodiment, the lock device may be provided at the main rotation link 14 (mounting bracket 6) and the main rotation link 35 (mounting bracket 32), instead of the main rotation link 13 (mounting bracket 5) or the main rotation link 34 (mounting bracket 31).

In the first embodiment and the second embodiment, the lock device 21 may be provided at one of the sub rotation links 15 or one of the sub rotation links 36.

In this case, one sub rotation link 15 is integrally connected to the other sub rotation link 15 by means of a torque rod, and one sub rotation link 36 is integrally connected to the other sub rotation link 36 by means of a torque rod.

In the first embodiment and the second embodiment, the operation force (lock releasing operation force) may be, for example electrically transmitted to the lock device 21 (releasing link 25). In the first embodiment and the second embodiment, another type of the lock device 21 may be used.

In the first embodiment and the second embodiment, each of the link device 11 and the link device 33 includes a X-arm type mechanism, however, another type may be used. The present invention may be applied to another type of seat, such as a train seat.

According to the present invention, the lock device can prohibit or allow the rotation of the rotation link, not as the ottoman device disclosed in 2000-201772A, in which each of the links are rotatably connected.

Specifically, because the ottoman main body is supported by the lock device, which is attached to the rotational center of the rotation link, the supporting position is provided forward relative to the position of the supporting position of the ottoman main body disclosed in 2000-201772A.

Thus, even when an external force is applied to the ottoman main body when the ottoman main body is in an extended state, a distance between a position, at which the ottoman main body is controlled by the lock device, to the external force becomes shorter than a distance in the ottoman main body disclosed in 2000-201772A. Consequently, a torque generated at the rotation link can be reduced.

Thus, in the present invention, the supporting strength for the ottoman main body by the rotation link can be secured appropriately.

In the present invention, because the rotation links are provided so as to be paired in a seat width direction, the supporting strength for the ottoman main body by the rotation link can be further secured appropriately.

Further, according to the present invention, the lock device is provided at one of the rotation links in order to prohibit and allow the rotation thereof, and the rotation of the main rotation link is transmitted to the main rotation link by means of the torque rod, which is made of a simple rigid body. Thus, the number of parts can be reduced.

In the present invention, because the ottoman main body is based by the biasing means so as to be extended, it can be extended automatically or with a minor operation force.

In the present invention, because the pair of the rotation links, which are connected by means of the torque rod, is located at most inward position within the link devices, mountability of the link device, or mountability of the ottoman device can be simplified.

According to the present invention, the biasing force from the biasing means is proportionally increased in accordance with the rotation of the rotation link in the other direction when the ottoman main body is stored within the seat.

On the other hand, regardless of that the biasing force is proportionally increased in accordance with the rotation of the rotation link in the other direction, the increment of the torque T, which is used to rotate the rotation link in one direction, is restrained. Thus, the operation force, which is required to store the ottoman main body 10, as a whole can be further equalized.

According to the present invention, the lock device can prohibit or allow the rotation of the rotation link, not as the ottoman device disclosed in 2000-201772A, in which each of the links are rotatably connected.

Specifically, because the ottoman main body is supported by the lock device, which is attached to the rotational center of the rotation link, the supporting position is provided forward relative to the position of the supporting position of the ottoman main body disclosed in 2000-201772A.

Thus, even when an external force is applied to the ottoman main body when the ottoman main body is in an extended state, a distance between a position, at which the ottoman main body is controlled by the lock device, to the external force becomes shorter than a distance in the ottoman main body disclosed in 2000-201772A. Consequently, a torque generated at the rotation link can be reduced.

Thus, in the present invention, the supporting strength for the ottoman main body by the rotation link can be secured appropriately.

In the present invention, because the rotation links are provided so as to be paired in a seat width direction, the supporting strength for the ottoman main body by the rotation link can be further secured appropriately.

Further, according to the present invention, the lick device is provided at one of the rotation links in order to prohibit and allow the rotation thereof, and the rotation of the main rotation link is transmitted to the main rotation link by means of the torque rod, which is made of a simple rigid body. Thus, the number of parts can be reduced.

In the present invention, because the ottoman main body is based by the biasing means so as to be extended, it can be extended automatically or with a minor operation force.

In the present invention, because the pair of the rotation links, which are connected by means of the torque rod, is located at most inward position within the link devices, mountability of the link device, or mountability of the ottoman device can be simplified.

According to the present invention, the biasing force from the biasing means is proportionally increased in accordance with the rotation of the rotation link in the other direction when the ottoman main body is stored within the seat.

On the other hand, regardless of that the biasing force is proportionally increased in accordance with the rotation of the rotation link in the other direction, the increment of the torque T, which is used to rotate the rotation link in one direction, is restrained. Thus, the operation force, which is required to store the ottoman main body 10, as a whole can be further equalized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An ottoman device comprising:
   a mounting bracket fixed to a front end of a seat;
   a first rotation link rotatably supported on the mounting bracket at a rotational axis, the first rotation link supporting an ottoman main body through a pair of oscillating links which are rotatably supported on the first rotation link so that the ottoman main body is extended to a front direction of the seat or stored within the seat in accordance with rotation of the first rotation link in a first direction and a second direction;
   a lock device for prohibiting or allowing the rotation of the first rotation link, the lock device arranged between the mounting bracket and the first rotation link around the rotational axis of the first rotation link; and
   biasing means having one end engaged with the front end of the seat and the other end engaged with a second rotation link in order to apply biasing force to the second rotation link so as to extend the ottoman main body in the first direction of the seat, the biasing force from the biasing means is set so as to be proportionally increased in accordance with a rotation of the second rotation link in the second direction when the ottoman main body is stored within the seat, the biasing means is attached in order to reduce an increment of the torque used for rotating the second rotation link in the first direction in accordance with the rotation of the second rotation link in the first direction.

2. The ottoman device according to claim 1, wherein the biasing means includes a coil spring generating the biasing force in an axial direction of the biasing means, and the biasing means is attached in order to proportionally decrease an angle between a line, which connects a rotational center of the second rotation link and a working point of the biasing force, and a working line of the biasing force, in accordance with the rotation of the second rotation link in the second direction thereof.

3. The ottoman device according to claim 1, wherein the biasing means includes a coil spring generating the biasing force in a circumferential direction of the biasing means, and the biasing means is attached in order to proportionally decrease a distance between a rotational center of the second rotation link and a working point of the biasing force, in accordance with the rotation of the second rotation link in the second direction thereof.

4. An ottoman device comprising:
a mounting bracket fixed to a front end of a seat;
a first rotation link rotatably supported on the mounting bracket at a rotational axis, the first rotation link supporting an ottoman main body through a pair of oscillating links which are rotatably supported on the first rotation link so that the ottoman main body is extended to a front direction of the seat or stored within the seat in accordance with rotation of the first rotation link in a first direction and a second direction;
a lock device for prohibiting or allowing the rotation of the first rotation link, the lock device arranged between the mounting bracket and the first rotation link around the rotational axis of the first rotation link, wherein two first rotation links are provided so as to be paired in a seat width direction, the lock device is provided to one of the first rotation links and a torque rod is provided so as to connect one first rotation link to the other first rotation link; and
biasing means having one end engaged with the front end of the seat and the other end engaged with a second rotation link in order to apply biasing force to the second rotation link so as to extend the ottoman main body in the first direction of the seat, the biasing force from the biasing means is set so as to be proportionally increased in accordance with the rotation of the second rotation link in the second direction when the ottoman main body is stored within the seat, the biasing means is attached in order to reduce an increment of the torque used for rotating the second rotation link in the first direction in accordance with the rotation of the second rotation link in the first direction.

5. The ottoman device according to claim 4, wherein the biasing means includes a coil spring generating the biasing force in an axial direction of the biasing means, and the biasing means is attached in order to proportionally decrease an angle between a line, which connects a rotational center of the second rotation link and a working point of the biasing force, and a working line of the biasing force, in accordance with the rotation of the second rotation link in the second direction thereof.

6. The ottoman device according to claim 4, wherein the biasing means includes a coil spring generating the biasing force in a circumferential direction of the biasing means, and the biasing means is attached in order to proportionally decrease a distance between a rotational center of the second rotation link and a working point of the biasing force, in accordance with the rotation of the second rotation link in the second direction thereof.

7. An ottoman device comprising:
a mounting bracket fixed to a front end of a seat;
a first rotation link rotatably supported on the mounting bracket at a rotational axis, the first rotation link supporting an ottoman main body through a pair of oscillating links which are rotatably supported on the first rotation link so that the ottoman main body is extended to a front direction of the seat or stored within the seat in accordance with rotation of the first rotation link in a first direction and a second direction;
a lock device for prohibiting or allowing the rotation of the first rotation link, the lock device arranged between the mounting bracket and the first rotation link around the rotational axis of the first rotation link, wherein two first rotation links are provided so as to be paired in a seat width direction, the lock device is provided to one of the first rotation links and a torque rod is provided so as to connect one first rotation link to the other first rotation link;
link devices including the two first rotation links, and the two first rotation links are connected to the torque rod and are located at a most inward position within the link devices; and
biasing means having one end engaged with the front end of the seat and the other end engaged with a second rotation link in order to apply biasing force to the second rotation link so as to extend the ottoman main body in the first direction of the seat, the biasing force from the biasing means is set so as to be proportionally increased in accordance with the rotation of the second rotation link in the second direction when the ottoman main body is stored within the seat, the biasing means is attached in order to reduce an increment of the torque used for rotating the second rotation link in the first direction in accordance with the rotation of the second rotation link in the first direction.

8. The ottoman device according to claim 7, wherein the biasing means includes a coil spring generating the biasing force in an axial direction of the biasing means, and the biasing means is attached in order to proportionally decrease an angle between a line, which connects a rotational center of the second rotation link and a working point of the biasing force, and a working line of the biasing force, in accordance with the rotation of the second rotation link in the second direction thereof.

9. The ottoman device according to claim 7, wherein the biasing means includes a coil spring generating the biasing force in a circumferential direction of the biasing means, and the biasing means is attached in order to proportionally decrease a distance between a rotational center of the second rotation link and a working point of the biasing force, in accordance with the rotation of the second rotation link in the second direction thereof.

* * * * *